Figure 1:
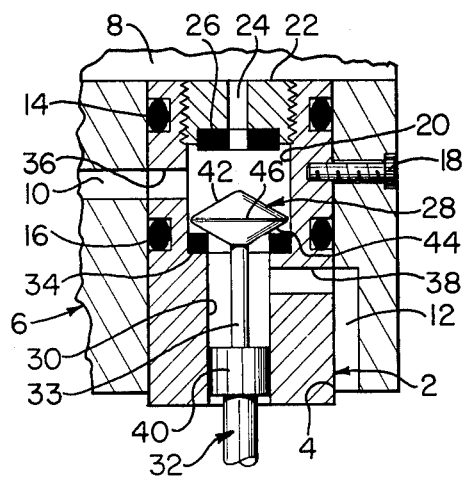

United States Patent [19]

Haytayan

[11] 4,051,862

[45] Oct. 4, 1977

[54] CONTROL VALVES

[76] Inventor: Harry M. Haytayan, Sunnyside Lane, Lincoln, Mass. 01773

[21] Appl. No.: 641,024

[22] Filed: Dec. 15, 1975

[51] Int. Cl.$^2$ ............................................. F15B 13/02
[52] U.S. Cl. .............................. 137/454.2; 137/625.27
[58] Field of Search ....................... 137/625.27, 625.25, 137/625.67, 102, 116, 454.2, 454.6

[56] References Cited

U.S. PATENT DOCUMENTS

| | | | |
|---|---|---|---|
| 2,154,477 | 4/1939 | Sinclair | 137/625.27 X |
| 2,645,451 | 7/1953 | Gladden | 137/625.27 X |
| 2,963,038 | 12/1960 | Sharp | 137/454.6 |
| 2,971,090 | 2/1961 | Piet et al. | 137/625.64 |
| 2,977,989 | 4/1961 | Meynell | 137/625.27 X |
| 3,727,631 | 4/1973 | Suezawa | 137/625.27 X |

FOREIGN PATENT DOCUMENTS 1,063,631  8/1959  Germany .......................... 137/625.27

Primary Examiner—Alan Cohan
Attorney, Agent, or Firm—Schiller & Pandiscio

[57] ABSTRACT

A simple and rugged three-way valve is provided which may be used as a trigger-operated control valve for portable pneumatic tools. The valve utilizes a valve member which is slidably disposed in a valve chamber for reciprocal movement between two valve seats and is tapered at its periphery so that it cannot obstruct a side port that is located between the valve seats.

14 Claims, 4 Drawing Figures

CONTROL VALVES

This invention relates to valves and more particularly to control valves for fluid-operated devices.

Certain pneumatic-operated devices as, for example, impact tools for driving fasteners into concrete through the utilization of the kinetic energy of a hammer or driver member, require control valves that are low cost, reliable, and rugged. Heretofore it has been proposed to employ a three-way ball valve of the type comprising a valve body having two axially aligned ports each with its own valve seat and a third side port located between the other two ports, a valve member in the form of a ball which is free to move between the two valve seats, and an actuating pin for urging the ball to seat against one of the two valve seats. Such a valve is disclosed in U.S. Pat. No. 3,711,008 as the trigger-operated control valve for a pneumatically operated impact tool for driving nails. However, while such a ball valve has certain advantages, it suffers from the limitations that its operation is not sufficiently precise and occasionally the spherical valve member will tend to impede full flow through the side port when it is disposed intermediate its two valve seats.

Accordingly the primary object of this invention is to provide a flow control valve which has substantially all of the advantages and also improves upon ball valves of the type shown in said U.S. Pat. No. 3,711,008.

Another object is to provide a three-way valve of the type described wherein the valve member cannot obstruct the side port.

A further object is to provide a flow control valve with a valve member that is shaped to provide excellent seating, is self-guiding and will not bind in its chamber, has a short operating stroke and assures full flow and quick response.

Another object is to provide a valve which is capable of assuming a "safety" position in the event than an excessive fluid pressure is applied to it.

These and other objects which are hereinafter described or rendered obvious are achieved by providing a valve which in its preferred embodiment has a valve body with at least three ports, a slide valve assembly comprising a valve member with opposed seating surfaces, and first and second valve seats disposed so that (1) a first port is blocked off when one valve seat is engaged by one of the seating surfaces of the valve member, (2) a second port is blocked off when the other valve seat is engaged by the other seating surface of the valve member, and (3) the valve member passes by the third port as it moves from one seat to the other. The valve member is tapered at its periphery so as to minimize interference with flow through the third port and also to reduce the area of possible frictional engagement with the surrounding portion of the valve body. In its "fail-safe version," the valve is designed so that when a predetermined fluid pressure level is excelled, one of the valve seats will yield enough to let the valve member reach a safety or fail-safe position in which it is retained by the fluid pressure and fluid can flow through the port associated with that valve seat.

Figure 2:
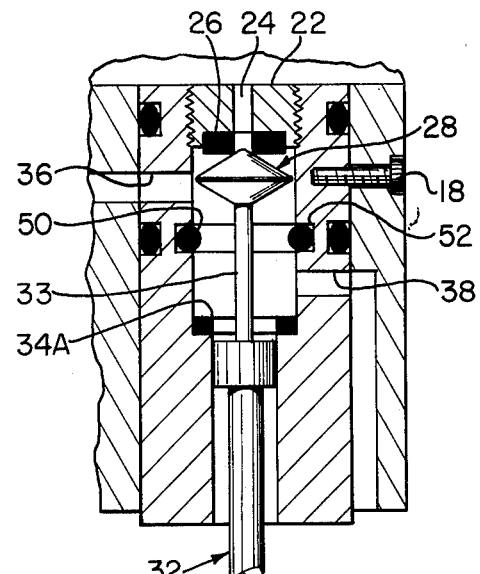
Figure 3:
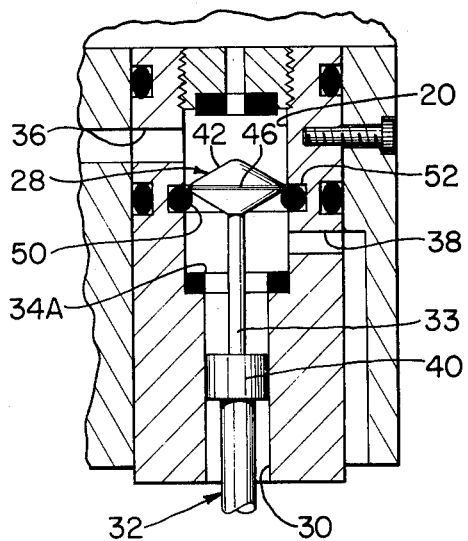
Figure 4:
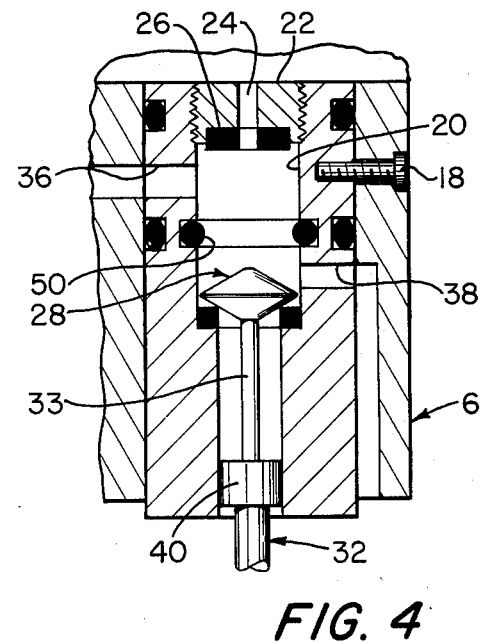

Other features and advantages of this invention are described or rendered obvious by the following detailed description which is to be considered together with the accompanying drawings wherein:

FIG. 1 shows a preferred form of the invention without the "fail-safe" feature; and FIGS. 2-4 show a preferred form of the invention with the fail-safe feature, with FIG. 4 showing the valve member in its fail-safe position.

In the several views, the same numerals are used to identify the same parts.

The valves shown in the drawings are designed for use as substitutes for the trigger-operated control valves shown in U.S. Pat. No. 3,711,008 and my copending U.S. patent application Ser. No. 496,458, filed Aug. 12, 1974, now U.S. Pat. No. 3,927,459, for Process For Feeding And Driving Nails. However, they also may be used as valves for other devices.

Referring now to FIG. 1, the illustrated valve comprises a casing or valve body 2 which preferably has a cylindrical outer surface so that it can be inserted into a round bore 4 formed in a part of the wall 6 of the housing of a tool or other device with which it is to be used. Although the tool housing is not shown in detail, for the purpose of describing the invention, let it be assumed that the tool is a pneumatically operated impact tool like that shown in U.S. Pat. No. 3,711,008 and that the housing wall 6 helps define at least part of a high pressure reservoir air chamber 8 and includes a passageway 10 leading to a pressure-operated mechanism, and an air vent passageway 12, the foregoing corresponding respectively to the reservoir 204, opening 218 and air vent hole 222 shown in FIG. 4 of said U.S. Patent. The valve casing 2 has two axially spaced peripheral grooves to accommodate resilient O-rings 14 and 16 which serve to prevent the pressurized operating fluid such as air from leaking out between the valve casing and the surrounding tool housing wall 6. The valve casing 2 may be secured in place by any convenient means, e.g., by a set screw 18.

Valve casing 2 is formed with a large axially-extending bore 20 which serves as a valve chamber and is threaded at its outer end to receive a bushing 22 that defines a port or orifice 24 leading to the high pressure air chamber 8. An apertured pad or flat ring 26 preferably made of a resilient material, is secured to the inner end of the bushing and serves as a valve seat for a control valve member 28 hereinafter described. Preferably pad 26 is secured in a countersink formed in the inner end of the bushing so that the surrounding wall portion of the bushing assists in holding it in shape and in place. Pad 26 may be secured to the bushing by means of molding it in place or by a suitable cement or by one or more mechanical fasteners. The aperture in pad 26 and the orifice 24 are coaxial with bore 20. Casing 2 also has a round bore 30 at its other end to accommodate a valve rod assembly 32 including a stem 33 that is connected directly to valve member 28. Bore 30 is coaxial and connects with bore 20. Bore 30 is smaller in diameter than bore 20. Hence, at the inner end of bore 30 the valve casing 2 has an annular shoulder to which is secured another apertured pad 34 that is like pad 26 and also serves as a valve seat for valve member 28. Intermediate the two valve seats, valve casing 2 is provided with a side port 36 that connects directly with the passageway 10 formed in the wall section of housing 6. The control valve casing has another port 38 that at one end communicates with bore 30 below pad 34 and at the other end is open to the atmosphere via the vent opening 12 formed in the wall of housing 6. The valve rod assembly 32 includes a piston 40 that is sized to make a close sliding fit in bore 30. The internal diameter of pad 34 is equal to or slightly greater than the diameter of bore 30 so as to allow the valve member and its rod assembly to be inserted into the casing via the upper end of bore 20.

Control valve member 28 is shaped as hereinafter described so that when it is moved up against pad 26, it will close off port 24 and when it is moved down against pad 34, it will close off the control valve chamber 20 from bore 30 and thus block flow of fluid from chamber 20 to port 38. However, in either position control valve member 28 is incapable of blocking off the side port 36 leading to passageway 10. In this connection it is to be noted that valve member 28 has upper and lower conically tapered surfaces 42 and 44 which form a narrow circular edge or rim 46 where they come together. While the rim 46 may be sharply angular or a knife edge, it is preferred that it be rounded slightly as shown. Of course, since valve member 28 is secured to the inner end of rod assembly 32 (and preferably the two are integral parts of a one-piece unit), the bottom surface 44 is actually frusto-conical provided, however, that when the valve member is seated against pad 26 its truncated upper end must still be able to intrude into the aperture of pad 26 so as to assure that the port 24 is substantially fully closed off. Valve member 28 is sized so as to make a sliding fit in bore 20. Typically, a diametrical clearance of between 0.001 and 0.005 inch is provided. This not only provides a good sliding fit but also assures that air can leak between the rim 46 and the surrounding wall which defines bore 20. Hence fluid can flow rapidly around the rim of the valve member to the outlet port 38 whenever the valve member moves up out of engagement with valve seat 44. Similarly fluid can pass into the valve via port 24 as soon as the valve member moves down out of engagement with valve seat 26.

The piston 40 makes a close sliding fit with the surrounding portion of the valve casing which defines bore 30 and serves primarily to keep the piston rod assembly and the valve member aligned with the axis of bore 30, thereby assuring that the valve will not bind up in the valve casing.

As a person skilled in the art will readily understand, if chamber 8 is filled with a pressurized fluid such as high pressure air supplied by an air compressor (not shown), the air in chamber 8 will pass into the control valve through port 24 and force valve member 28 to engage valve seat 34 tightly, thereby closing off the aperture formed by that valve seat (as shown in FIG. 1) and preventing air from escaping to the atmosphere via port 38 and vent hole 12. At the same time the air passing through the port 24 is able to exit the valve chamber 20 via side port 36 and passageway 10. If subsequently the valve assembly 32 is moved upwardly, e.g. by means of a trigger member like the trigger member shown in U.S. Pat. No. 3,711,008, the valve member 28 will move off of the valve seat 34 and thereby expose its aperture to high pressure air within the valve chamber, with the result that air can escape from the valve chamber 20 to the atmosphere via port 38 and vent opening 12. So long as the valve member 28 is not seated tightly on either valve seat, air in chamber 8 and also air in the passageway 10 can leak to the atmosphere via port 38. If the valve assembly 32 is moved upwardly far enough for valve member 28 to tightly engage valve seat 26, the aperture defined by the latter valve seat will be blocked off with the result that the valve chamber 20 will be closed off from the high pressure chamber 8 and air in the passageway 10 cam be dumped to the atmosphere via port 36, the aperture formed by valve seat 34, the port 38 and vent opening 12. As is believed obvious, the stroke through which the valve member 28 is required to be moved in order to unblock the aperture formed by valve seat 34 and block the aperture formed by valve seat 26 is relatively short and can be accomplished very fast. Additionally, it is to be noted that air can begin to be discharged from the valve chamber 20 as soon as valve member 28 begins to move away from valve seat 34 and the taper of the frusto-conical valve surface 34 facilitates rapid flow of air out of the valve via the aperture formed by valve seat 34. It is to be noted that in the valve of FIG. 1, the side port 36 is closer to the valve seat 26 than it is to the valve seat 24; however, it could be located closer to the valve seat 34.

The embodiment shown in FIGS. 2, 3 and 4 is similar to that of FIG. 1 except that the valve chamber 20 has a longer axial dimension in order to accommodate an auxiliary valve seat in the form of an O-ring 50 which is secured firmly in place in an interior groove 52 formed in the surrounding side wall of the valve body 2. The O-ring may be secured in place with a cement or it could be molded in place and machine finished to the correct inside diameter. The O-ring 50 is disposed at approximately the same axial position as the valve seat 34 in FIG. 1, while the valve seat 34A is located at the bottom end of the bore 20. Additionally, the stem 33 of the valve member 28 is longer than in the embodiment of FIG. 1. The O-ring 50 is sized so that its inside diameter is smaller than the diameter of the rim portion 46 of the valve member, with the result that the O-ring is capable of functioning as a valve seat and will support the valve member 28 as shown in FIG. 3 so long as the pressure applied to the valve surface 42 does not exceed a predetermined safe level. So long as valve member 28 is supported by O-ring 50, air cannot escape from the valve chamber 20 via port 38. If the air pressure acting on the upper surface 42 of the valve member exceeds the predetermined safe level, the valve member 28 will be driven downward to the position shown in FIG. 4, with the O-ring yielding to the extent required to allow the valve member 28 to pass and move down into engagement with valve seat 34A. Valve member 28 will remain engaged with valve seat 34A so long as the pressure exerted on its upper surface 42 is of sufficient magnitude. Hence, in the absence of any prevailing counterforce as might be applied by a trigger or other member, the valve member 28 will remain seated on valve seat 34A. When the system pressure is returned to or below the predetermined safe pressure level, the operator may return the system to its normal operating mode by forcing the valve assembly 32 upwardly with enough force so that the valve member 28 will pass through the O-ring 50 and reassume the position shown in FIG. 2 or FIG. 3. FIG. 2 illustrates the position occupied by the valve member 28 when the valve assembly is moved upwardly for the purpose of closing off the valve port 24 and allowing air to pass freely between the passageway 10 and the vent opening 12.

The significance of the embodiment of FIGS. 2, 3 and 4 will be appreciated if it is assumed that the valve is used as the trigger operated valve in a pneumatic impact tool such as the one shown in U.S. Pat. No. 3,711,008. With reference to such patent, the side port 36 would connect with passageway 218, the port 38 would lead to the atmosphere, and the port 24 would lead to the high pressure air reservoir chamber 204. When the tool is at rest with high pressure air in chamber 204, the control valve will be in the state shown in FIG. 3. If subsequently the pressure in the air reservoir chamber of the tool builds up so that it exceeds the predetermined safe level, the air pressure applied through the port 24 will force the piston member 28 from the position shown in FIG. 3 to the position shown in FIG. 4, with the result that the air pressure in those portions of the tool that are connected with port 36 will be diminished as the result of air passing through the ports 24 and 36 to the atmosphere via port 38 and vent opening 12. This dumping of air automatically disables the impact tool and the tool will remain disabled until the valve member 28 is restored to the position shown in FIG. 3, whereupon air can no longer escape via port 38 and the tool can again be pressurized. Air escaping from the port 38 while the tool is connected to a source of high pressure air is an indication to the operator that the pressure in the reservoir chamber is or at one time was in excess of the predetermined safe level. Of course the safe pressure level, i.e. the level which is required to be exceeded to cause the O-ring to compress enough to allow the valve member to move to the position of FIG. 4, is determined by the dimension and the durometer or compressibility of the O-ring 50.

Other advantages will be obvious to persons skilled in the art. It is to be understood also that the invention is susceptible of various modifications. Thus, for example, in the embodiment of FIGS. 2-4, the O-ring 50 could be replaced by some other form of resilient flexure member capable of functioning as a valve seat in the manner herein described, e.g. the O-ring 50 may be replaced by a flat resilient annulus similar in shape to the resilient pad 26 except that its internal diameter would be comparable to that of the O-ring 50.

What is claimed is:

1. A control valve comprising:
   a hollow valve casing having (1) a slide bore for a slide valve unit, (2) first, second and third ports for conducting flow of fluid into and out of said casing, and (3) first and second resilient valve seats surrounding first and second openings leading to said first and second ports respectively, said valve seats being aligned with said slide bore; and
   a slide valve unit having a valve stem slidably disposed in said slide bore and a valve head attached to the inner end of said stem and movable by said stem into engagement alternatively with said first and second valve seats, said valve head being generally diamond shaped in longitudinal section and being sized so that said valve head forms a close sliding fit with the surrounding portion of said casing, (2) fluid pressure applied via said first port and said first opening will force said valve member away from said first valve seat toward said second valve seat, (3) when it is engaged with either said first or second valve seat it will block flow of fluid through said first or second opening respectively, and (4) at all positions along its path of travel between the two valve seats it is incapable of blocking flow of fluid into or out of the casing via said third port.

2. A valve according to claim 1 further including a bushing secured in one end of said valve casing, and further wherein said first valve seat is attached to the inner end surface of said bushing and comprises an annulus disposed in a recess in said inner end surface, and said casing has a cylindrical outer surface such that it may be inserted into a round bore in the housing of the tool or device with which it is to be used, said valve being further provided with O-ring sealing means for preventing leaks between said valve casing and said tool housing.

3. A valve according to claim 2 wherein said bushing has an outer diameter greater than the diameter of said valve head.

4. A valve according to claim 1 wherein said close sliding fit is characterized by a diametrical clearance of between 0.001 and 0.005 inch between said valve head and the surrounding portion of said valve casing.

5. A control valve comprising:
   a hollow valve casing having (1) a slide bore for a slide valve unit, (2) first, second and third ports for conducting flow of fluid into and out of said casing, and (3) a first valve seat surrounding said first port, and a second valve seat disposed between said first port and said third port and between said second port and said third port, said valve seats being aligned with said bore; and
   a slide valve unit having a valve stem disposed within said slide bore and a valve head attached to the inner end of said stem and movable by said stem into engagement alternately with said first and second valve seats so long as the fluid pressure within the valve is below a predetermined level, with said second valve seat being arranged so that if the fluid pressure applied via said first port is above said predetermined level, said second valve seat will yield far enough to allow said valve member to pass by said second valve seat, said valve head being arranged so that (1) its periphery makes a close sliding fit with the surrounding portion of the casing, (2) fluid pressure applied via said first port will force said valve member away from said first valve seat toward said second valve seat, (3) when it is engaged with said first valve seat it will block the flow of fluid via the first port (4) when it is engaged with said second valve seat it will block the flow of fluid past said second valve seat, and (5) at all positions other than when said valve head is engaged with said second valve seat the valve head will be incapable of preventing the flow of fluid through the casing via said third port.

6. A valve according to claim 5 wherein said valve head is generally diamond shaped in longitudinal section.

7. A valve according to claim 5 wherein said valve casing has an opening at one end and a bushing secured in said opening, and further wherein said first valve seat is attached to the inner end surface of said bushing.

8. A valve according to claim 7 wherein said bushing has an outer diameter greater than the diameter of said valve head.

9. A valve according to claim 5 wherein said close sliding fit is characterized by a diametrical clearance of between 0.001 and 0.005 inch between said valve head and the surrounding portion of said valve casing.

10. A valve according to claim 6 wherein said valve casing has a cylindrical inner surface and said second valve seat is a ring-like resilient flexure member mounted in a groove in said inner surface.

11. A valve according to claim 10 wherein said second valve seat is an O-ring.

12. A valve according to claim 6 wherein said valve casing defines an elongate valve chamber which is aligned with said slide bore, and said valve member is slidably disposed within said valve chamber and said first valve seat is at one end of said valve chamber.

13. A valve according to claim 12 further including a resilient valve seat disposed at the opposite end of said valve chamber.

14. A valve according to claim 6 wherein said valve unit comprises a piston disposed within and making a close sliding fit with said slide bore.

* * * * *